Aug. 19, 1924.
N. J. TRUMBULL
1,505,824
DEVICE FOR APPLYING ANTISKID CHAINS TO AUTOMOBILE TIRES
Filed June 23, 1923
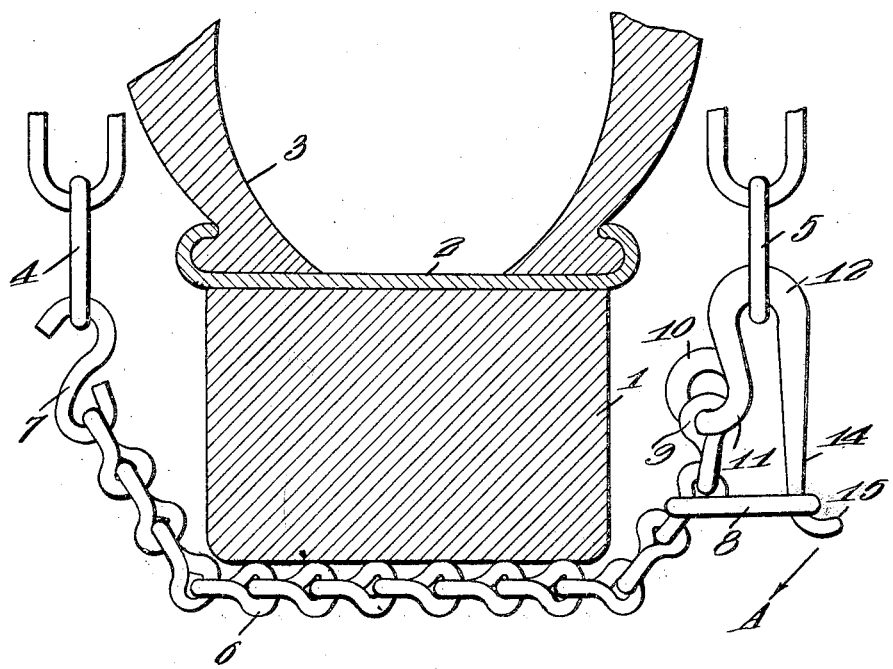
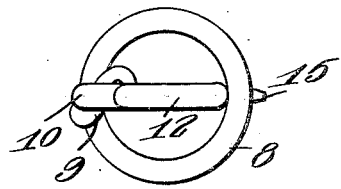

Patented Aug. 19, 1924.

1,505,824

UNITED STATES PATENT OFFICE.

NELSON JAMES TRUMBULL, OF WHITEWATER, COLORADO.

DEVICE FOR APPLYING ANTISKID CHAINS TO AUTOMOBILE TIRES.

Application filed June 23, 1923. Serial No. 647,346.

*To all whom it may concern:*

Be it known that I, NELSON J. TRUMBULL, a citizen of the United States, residing at Whitewater, in the county of Mesa and State of Colorado, have invented a new and useful Device for Applying Antiskid Chains to Automobile Tires, of which the following is a specification.

This invention aims to provide a simple means for mounting anti-skid chains on vehicle tires, the construction being such that it will be unnecessary to have any slack in the skid chain to permit the mounting thereof and it being possible to mount the anti-skid chain on the tire and reel the chain around the tire whilst the wheel which carries the tire is rotating slowly in a mud hole.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in elevation, a device constructed in accordance with the invention, a wheel body, rim and casing appearing in section; and Figure 2 is a plan showing the latch mechanism at one end of the device.

The numeral 1 marks the felly of a wheel, the felly carrying a rim 2 whereon a tire casing 3 is mounted. The side portions of anti-skid chains are marked by the numerals 4 and 5.

In carrying out the invention there is provided a flexible element 6 such as a chain. With one end of the chain 6 is assembled a securing member 7, which may be a sigmoidal hook, the hook being detachably engaged with the side portion 4 of the anti-skid chain, the flexible element 6 extending across the wheel felly 1. The chain 6 passes through a ring 8, located at one side of the felly 1. The terminal link 9 of the chain 6 is engaged with an eye 10 formed on the end of the short arm 11 of a U-shaped latch 12 comprising a long arm 14, the side portion 5 being seated in the latch 12, the long arm 14 of the latch passing through the ring 8 and terminating in an outstanding finger 15, cooperating with the ring 8 to prevent the ring from sliding off the arm 14.

In practical operation, the arm 14 of the latch 12 may be swung inwardly, in the direction of the arrow A in Figure 1 until the finger 15 is clear of the ring 8, whereupon the ring 8 may be swung in the direction of the arrow A thereby setting the arm 14 of the latch free. The latch 12 then may be swung upwardly, in a direction opposite to that indicated by the arrow A, the arm 14 being disengaged from the part 5 of the anti-skid chain.

It will be observed that the putting on of the anti-skid chain, or in the removal thereof, it will be unnecessary to have any slack in the anti-skid chain 4—5, the latch 12 being hooked readily through the part 5 and being held in the position shown in Figure 1, by the cooperation between the ring 8 and the arm 14. The ring 8 is of such a diameter that the end of the chain 6 which carries the securing member 7 may be threaded through the ring, thereby enabling the ring to be moved along the chain 6, to its place of pivotal mounting between adjoining links, as clearly shown at the right hand side of Figure 1.

What is claimed is:

In a device of the class described, an anti-skidding member, a chain comprising links, and connected at one end to one side portion of the anti-skidding member, a U-shaped latch engaged through the opposite side portion of the anti-skidding member and including a long arm and a short arm, the short arm being pivotally assembled with one link of the chain, the long arm having a finger, and a ring mounted pivotally and releasably between adjoining links of the chain, the ring receiving the long arm, and the finger constituting a retainer for the ring, the ring being of such a diameter that the first specified end of the chain may be threaded through the ring, thereby enabling the ring to be moved along the chain to its place of pivotal mounting between said adjoining links.

In testimony that I claim the foregoing as my own, I have hereto affixed my signature in the presence of two witnesses.

NELSON JAMES TRUMBULL.

Witnesses:
W. E. GULLEY,
H. L. CHEEDLS.